March 13, 1934.  J. BIJUR  1,950,391
FLOW CONTROL FITTING
Original Filed Aug. 9, 1922
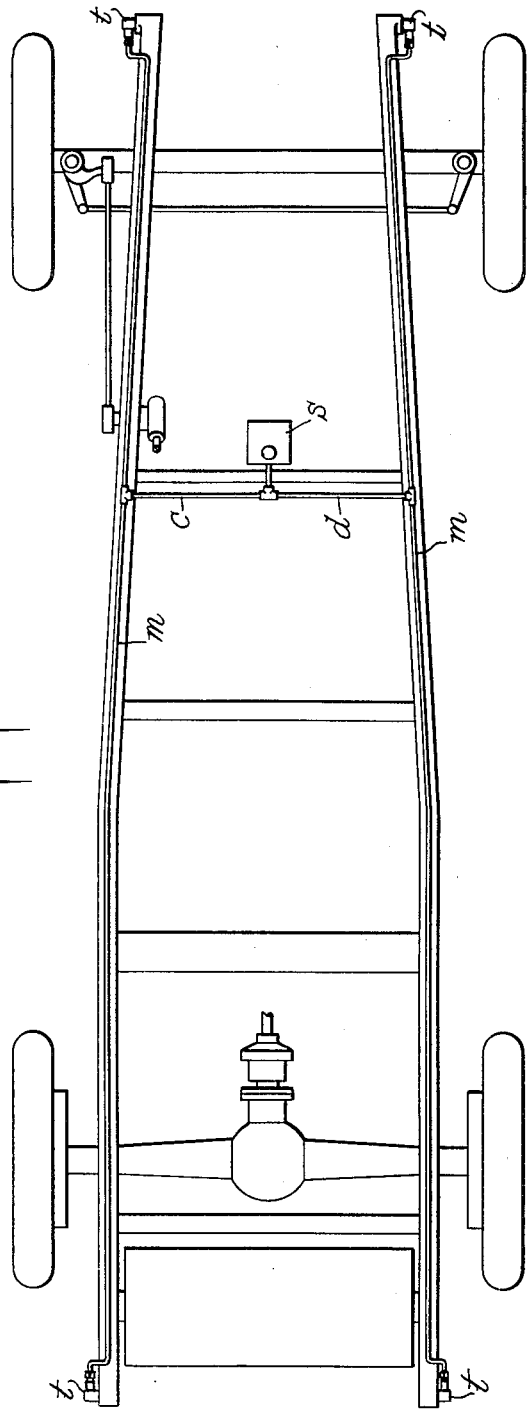
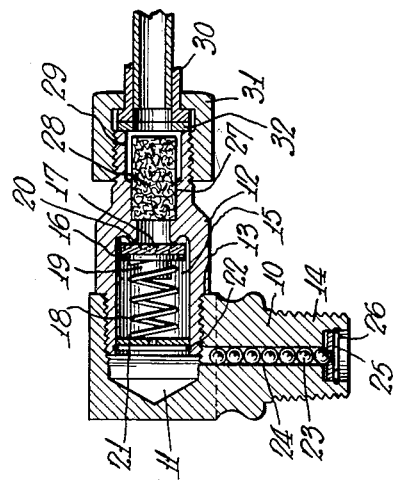
INVENTOR
*Joseph Bijur*
BY
Dean, Fairbank, Chright Hirsch
his ATTORNEYS.

Patented Mar. 13, 1934

1,950,391

UNITED STATES PATENT OFFICE 1,950,391

FLOW CONTROL FITTING

Joseph Bijur, New York, N. Y., assignor to Auto Research Corporation, a corporation of Delaware Original application August 9, 1922, Serial No. 580,668. Divided and application June 5, 1928, Serial No. 282,958, now Patent No. 1,732,828, dated October 22, 1929. Divided and this application July 22, 1929, Serial No. 380,156

9 Claims. (Cl. 184—7)

My present invention relates primarily to chassis lubrication and is more especially concerned with flow control devices of the general type disclosed in my issued Patent No. 1,632,772 of June 14, 1927, and known as "drip plugs", the flow rating of which is not subject to fortuitous variation.

Among the objects of the invention are to provide a compact drip plug construction of the above type, the constituent parts of which may be readily made by automatic machinery, in mass production and readily assembled, by unskilled operatives, which shall feed with a high degree of precision and by which is dispensed with the need for resistance or obstruction elements calibrated to diverse lengths, diameters, compressions or the like for the various differentiated flow ratings.

Another object is to provide resistance or obstruction elements of the character referred to which may be produced by familiar methods in large quantities and at extremely small cost, and which lend themselves for the purpose in hand, to ready selection of those that have the required dimensions within very close tolerance limits.

The objects are accomplished by the use of a drip plug fitting having a cavity of definite size, in which are inserted one or more flow obstructing restriction fillers of uniform proportions, each extending but a small fraction of the length or volume of the cavity, the rating of the drip plug depending upon the number of such fillers, the greater the number the slower the rating.

In a preferred specific embodiment the drip plug fitting has a longitudinal cylindrical bore in which are closely fitted one or more metal spheres or balls.

The selection of the metal spheres or balls of proper size from a batch containing under and over-sized balls made according to familiar inexpensive processes, for the present purpose is readily accomplished by conventional sorting methods well known to those skilled in the art, such as rolling the balls along rails diverging at a very small angle, whereby balls of various sizes drop at different portions of the length of the rails and are thus sorted for size.

This application is a division of my copending application Serials No. 282,958 filed June 5, 1928, Patent No. 1,732,828, which in turn is a division of an earlier application Serial No. 580,668 filed August 9, 1922.

In the accompanying drawing in which is shown one of various possible embodiments of the several features of the invention, Fig. 1 is a diagrammatic view indicating the application of the fitting to a chassis; and Fig. 2 is a transverse sectional view on a larger scale showing the construction of one embodiment of the fitting.

Referring now to the drawing, I have shown diagrammatically the general layout of the chassis of an automobile having a lubricant supply unit S, illustratively on the dashboard. The distributing system includes headers $c$ and $d$, which communicate at their ends with the respective mains $m$ extending the length of the channel frames and feeding various bearings at or near which the drip plug terminals $t$ are applied. Bridging conduits (not shown) are provided leading to similar drip plugs (not shown) at or near the corresponding bearings.

The fitting of Fig. 2 is shown elbow-shaped and comprises a support element 10 provided with a transverse socket 11 into which is threaded an inlet fitting or cartridge 12 which illustratively extends at right angles to the support. The support is formed preferably of square or polygonal stock whereby the end area of shoulder 13 on the cartridge will contact one of the flat sides. The support has a threaded nipple 14 for insertion into a bearing, bolt or other part to be lubricated.

The cartridge element 12 is shown with a bore 15 of large diameter for mounting the disk valve 16 which is preferably of diameter substantially as large as the fitting admits of and is provided with a seating portion 17 of a material which should be yielding to compensate for irregularities in the seat, smooth to seat completely under light pressure, substantially impervious and chemically inert to oil and non-sticking. A spring 18 coiled at its inner end about a lug 19 on the valve urges the latter against its seat 20, said spring reacting against a perforated plate 21 held in place in the inner part of the cartridge by a split ring 22.

In the present embodiment, the flow restriction is disposed in the base or stem fitting. It is illustratively shown as a metallic filler comprising a plurality of small spheres 23 which may be bird shot balls, within a corresponding longitudinal bore 24 in the support element. The balls to effect a resistance to flow equivalent to that of the wire rod plug in my Patent No. 1,632,772, must fit more snugly in the bore than does said wire since the restrictions which effectively retard flow in the case of the spheres are located at the equators only of the successive balls and not continuously through the length of the bore. The inner end of the cartridge 12 extends partly across the inner end of the bore 24 in which the restrictions are lodged, and a perforated disk 25 is retained in place by a split ring 26 at the bearing end of the support. The restriction balls though lodged closely in the bore, are thus also positively prevented from escaping.

The inlet end of the cartridge 12 preferably has a socket 27 within which is fitted a felt strainer plug 28 the inner end of which fits snugly therein while the outer end is preferably loose or spaced from the wall of the corresponding socket portion 29 of somewhat enlarged diameter as shown.

The end of the pipe line is connected to the drip plug by a suitable coupling. Illustratively a flanged collar 30 is soldered to the pipe line and clamped against the end of the fitting by a screw cap 31 threaded thereon, an interposed gasket 32 effecting a fluid tight connection.

The drip plug has a fixed resistance to flow determined by the balls 23, maintained invariant by the strainer plug 28 which intercepts any solid particles that might clog the minute crevice or become lodged at the valve.

It is obvious that the rating of the fitting of Fig. 2 will be determined entirely by the number of balls 24 inserted in the bore 23. One ball will give the fastest rating, two balls the next slower rating and when the bore is filled say with seven balls this will afford the slowest rating under a given pressure. The drip plug shank with its balls in place is connected with the valve fitting piece 12 which latter is universal to all of the drip plug fittings.

The resultant drip plug is a compact fitting in which the length of the mounting nipple 14, inserted into the bearing, serves to accommodate the flow restricting elements of the drip plug. Moreover the elbow shape of the drip plug illustratively shown provides a construction protruding but little from the bearing structure to which it is applied, and when used on an automobile is less likely to be knocked off than if the constituent fitting parts of a similar drip plug were axially aligned. The elbow form moreover presents the advantage that the inlet nipple extends in the general direction in which the feed pipe is ordinarily disposed so that the length of the latter need not be bent at a sharp angle for application of the coupling.

In operation when the drip plug is subjected to pressure applied to the distributing system shown in Fig. 1, the valve 16 will open and the oil is forced past the closely fitting equators of the spheres 23 in succession so that the oil emerges from the fitting slowly drop by drop.

Each bearing being equipped with a fitting having the number of restriction units therein appropriate to the flow rate desired, each bearing will receive the corresponding amount of oil under a given pressure applied to or existing in the distributing line. Should any drip plug flow too freely or too slowly, one with the correct number of restriction units therein would be readily substituted.

I claim:

1. As an element in a lubricating system, a pipe fitting having a plurality of small balls fitting snugly in the bore thereof, whereby pressure is absorbed in forcing oil between the bore and the balls.

2. A drip plug having a plurality of solid restriction members snugly fitted in a longitudinal bore thereof and forming small passages longitudinally spaced from each other, and a complementary fitting part having a valve therein.

3. A drip plug for a pressure lubricating system having a flow resistance passage restricted by a multiplicity of metal plugs in tandem in such a manner as to permit seepage but prevent free flow from the fitting under working pressure, said fitting having a sealing means permitting emission when a predetermined pressure is exceeded and preventing reverse flow through the resistance, and a strainer in the inlet end of said fitting having minute interstices capable of intercepting solid particles that might clog the resistance, the strainer presenting a substantial resistance to flow materially less than that incurred in said resistance passage.

4. As an element in a lubricating installation, a pipe fitting having a nipple to be applied to a bearing, said element having a check valve therein to prevent reverse flow of air through said fitting and having a plurality of plugs in tandem filling a part of a bore in said fitting to form a high resistance outlet in series with said valve and of resistance to flow greater than that of said valve.

5. A drip plug pipe fitting consisting of a body with a longitudinal bore and a plurality of metal plugs each substantially of the diameter of said bore in tandem within said bore substantially restricting the same.

6. In a centralized lubricating installation for a mechanism having a plurality of bearings, of the type comprising a central reservoir, a central pump receiving lubricant from said reservoir, and conduit means with an inlet from said pump and outlets to said respective bearings, each of said outlets containing an apportioning unit; each apportioning unit consisting of a highly restricting metering device and comprising a fitting having a bore with an inlet to be connected to said conduit means and an outlet to be connected to the bearing, said inlet and said outlet communicating with said bore, and a plurality of distinct flow restrictions positioned in tandem in said bore, each restriction taking the form of a plug having a portion of maximum transverse diameter to restrict said bore and another portion of smaller diameter not substantially restricting said bore, but contacting with and serving to space said restriction from the next restriction.

7. In a centralized lubricating installation for a mechanism having a plurality of bearings, of the type comprising a central reservoir, a central pump receiving lubricant from said reservoir, and conduit means with an inlet from said pump and outlets to said respective bearings, each of said outlets containing an apportioning unit; each apportioning unit consisting of a highly restricting metering device and comprising a fitting having a bore with an inlet to be connected to said conduit means and an outlet to be connected to the bearing, said inlet and said outlet communicating with said bore, and a plurality of distinct flow restrictions in said bore in tandem, said restrictions taking the form of identically shaped plugs of varying transverse diameters longitudinally of said bore and forming a continuous annular passageway through said bore having a plurality of sections of minimum area adjacent the middles of said plugs and of maximum area adjacent the ends of said plugs.

8. In a centralized lubricating installation for a mechanism having a plurality of bearings, of the type comprising a central reservoir, a central pump receiving lubricant from said reservoir, and conduit means with an inlet from said pump and outlets to said respective bearings, each of said outlets containing an apportioning unit; each apportioning unit consisting of a highly restricting metering device and comprising a fitting having a bore with an inlet to be connected to said conduit means and an outlet to be connected to the bearing, said inlet and said outlet communicating with said bore, and a plurality of solid restriction elements snugly fitted in said bore and forming small annular restriction passages longitudinally spaced from each other within said bore.

9. In a centralized lubricating installation for a mechanism having a plurality of bearings, of the type comprising a central reservoir, a central pump receiving lubricant from said reservoir, and conduit means with an inlet from said pump and outlets to said respective bearings, each of said outlets containing an apportioning unit; each apportioning unit consisting of a highly restricting metering device and comprising a fitting having a bore with an inlet to be connected to said conduit means and an outlet to be connected to the bearing, said inlet and said outlet communicating with said bore, and a plurality of distinct flow metal restrictions positioned in tandem in said bore, each fitting being made of two parts having a telescoping threaded connection with each other, one of which parts carries said bore, said connection permitting access to said bore for the addition or removal of one or more of said restrictions.

JOSEPH BIJUR.